Patented Mar. 13, 1951

2,545,285

UNITED STATES PATENT OFFICE 2,545,285

PROCESS FOR THE MANUFACTURE OF PERCHLOROMETHYL MERCAPTAN AND ITS SEPARATION FROM THE VARIOUS SULFUR COMPOUNDS

Mortimer J. Kamlet, Chattanooga, Tenn., assignor to Tennessee Products & Chemical Corporation, Nashville, Tenn., a corporation of Tennessee No Drawing. Application December 5, 1949, Serial No. 131,248

6 Claims. (Cl. 260—543)

The present invention relates to a process for the formation of perchloromethyl mercaptan, and of equal importance, comprehends an improved simplified procedure for the separation of perchloromethyl mercaptan from by-product sulfur monochloride and sulfur dichloride. The invention leads to a maximum yield of the desired perchloromethyl mercaptan, with a minimum by-product formation of carbon tetrachloride.

It has for its purpose to provide a simple, inexpensive and comparatively safe means for the removal of sulfur monochloride and sulfur dichloride from perchloromethyl mercaptan so that this valuable Diesel fuel additive can be made from cheap and readily available raw materials e. g., carbon disulfide and chlorine, without the necessity of submitting any of the intermediate reaction mixtures of said process to an expensive and sometimes hazardous separation by means of steam distillation and vacuum fractionation.

Perchloromethyl mercaptan, $Cl_3C-S-Cl$, when pure, is a lemon yellow oil, boiling with slight decomposition at 149° C. at atmospheric pressure. Its odors are lachrymatory and toxic in moderate concentrations, extremely annoying even in slight concentrations. It has been used as an additive for Diesel fuels or as a starting material in the preparation of additives for Diesel fuels and high pressure lubricants. The presence of even traces of the various sulfur chlorides imparts to the liquid a distinct reddish coloration.

Perchloromethyl mercaptan is formed by the reaction:

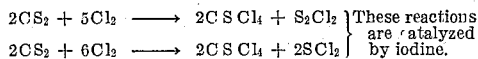

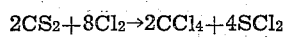 } These reactions are catalyzed by iodine.

Too much chlorination leads to the undesirable carbon tetrachloride:

$$2CS_2 + 8Cl_2 \rightarrow 2CCl_4 + 4SCl_2$$

Temperatures over 30° C., and sunlight or actinic radiation favor carbon tetrachloride formation. The chlorination is, therefore, effected under 30° C., and in the absence of sunlight or actinic radiation, but in the presence of an iodine catalyst.

There are, in the art, two commonly accepted methods for the preparation of perchloromethyl mercaptan. According to the method of Helfrich and Reid (Journ. Amer. Chem. Soc. 43 591 (1921)), carbon disulfide, containing about 0.3–0.4% by weight of iodine is chlorinated in the absence of direct sunlight, at a temperature maintained between 20° C. and 30° C., until the volume of the reaction mixture has just doubled. The crude reaction product, containing in addition to the perchloromethyl mercaptan, carbon tetrachloride, sulfur dichloride, $SCl_2$, and sulfur monochloride, $S_2Cl_2$, is distilled to remove the carbon tetrachloride (B. Pt. 77° C.) and most of the sulfur dichloride (B. Pt. 59° C.). The sulfur monochloride (B. Pt. 136° C.) boils too close to the perchloromethyl mercaptan to be separated by ordinary fractionation. The residue is then subjected to steam distillation, during which operation the sulfur monochloride is decomposed by the steam, giving, among other products, copious deposits of elementary sulfur. The oil layer, still containing traces of undecomposed sulfur monochloride, is then dried over a suitable drying agent and vacuum fractionated to give the pure product.

The method of Dyson (Org. Syn. Coll. vol. 1, pp. 506 to 510, Wiley, New York, 1941) differs only in that the preliminary distillation to remove low boiling fractions is eliminated and the chlorination is carried out at a slightly lower temperature (25° C. maximum).

The decomposition of the sulfur monochloride by steam treatment is quite difficult. A large volume of steam is required to decompose small amounts of the $S_2Cl_2$ and the considerable amounts of elementary sulfur, liberated in the decomposition, present a serious cleaning problem in view of the rather low solubility of sulfur in most commonly used solvents. In addition, this procedure, on a large scale, would necessitate the decontamination of rather large, malodorous quantities of water before disposal. The present invention permits the entire reaction to be carried out in one vessel, thereby eliminating much of the difficulty attendant in transferring and handling large quantities of this noxious material. The present invention also eliminates the necessity of steam distillation.

The bases of the present invention are the discoveries that the complete and rapid decomposition of sulfur monochloride can be effected by treatment with lower aliphatic alcohols such as ethanol, methanol, propanol, isopropanol, butanol, isobutanol, sec-butyl alcohol and mixtures thereof; that the complete and rapid decomposition of sulfur dichloride is effected by treatment with the lower aliphatic alcohols such as are recited above, as well as with lower aliphatic ethers such as dimethyl ether, methyl ethyl ether, diethyl ether, dipropyl ether, diisopropyl ether, isopropyl ethyl ether and mixtures thereof; and that chlorination to a volume equivalent to from about 2.0 to 2.5 times the original volume and preferably about 2.25 times the original volume, of the carbon disulfide converts most of the sulfur monochloride formed to sulfur dichloride without appreciably lowering the yield of perchloromethyl mercaptan.

The sulfur monochloride and sulfur dichloride react as follows with alcohols and ethers:

$$2EtOEt + 2SCl_2 \rightarrow 4EtCl + SO_2 + S$$
$$2EtOH + 2SCl_2 \rightarrow 2EtCl + 2HCl + SO_2 + S$$
$$2EtOH + 2S_2Cl_2 \rightarrow 2EtCl + 2HCl + SO_2 + 3S$$

It will be seen that all of the by-products of this decomposition are either highly volatile (alkyl chloride, gaseous HCl, gaseous $SO_2$) or solid (sulfur) and remain behind in the still when the perchloromethyl mercaptan is distilled. The perchloromethyl mercaptan is completely unaffected by the alcohol and/or ether treatment.

I have found that pure perchloromethyl mercaptan can be obtained by the sequence of steps involved in:

(a) Chlorinating carbon disulfide to from about 2.0 to 2.5 times its original volume and preferably about 2.25 times its original volume, i. e., chlorinating carbon disulfide until the volume of the chlorinated product is from 2.0 to 2.5 times, and preferably 2.25 times the volume of the original carbon disulfide, in the presence of 0.2–0.4% by weight of iodine as catalyst and in absence of direct sunlight, and maintaining the temperature by cooling to between about 5° C. and 30° C., preferably around 15° C., (b) Distilling to remove most of the sulfur chlorides produced in the form of the lower boiling sulfur dichloride, (c) Treating the pot residue with one or a mixture of the lower aliphatic alcohols abovementioned or, preferably, a mixture of a lower aliphatic alcohol or mixture of the same with one or a mixture of lower aliphatic ethers as above recited, to decompose any residual sulfur dichloride and the sulfur monochloride, (d) Distilling again to remove reaction products of this decomposition as well as the excess of the compounds used in decomposition and low boiling fractions, and (e) Vacuum distilling.

The product obtained in this manner is pure enough for most purposes. An even purer product may be obtained by treating the distillate with a further portion of a lower aliphatic ether or mixture thereof and repeating the distillation and vacuum distillation operations.

The following examples are given to define and illustrate the present invention, but in no way to limit it to proportions or conditions described therein. Obvious modifications and improvements will occur to any person skilled in the art. In each instance, chlorination is conducted in the absence of direct sunlight.

*Example I*

To 450 cc. $CS_2$ (567 g., 7.46 moles) in a 2-liter 3-necked flask fitted with thermometer, sparger (for chlorination) and fractionating column (60 cm. column packed with glass helices leading through condenser to vacuum take-off and vapor trap) is added 1.6 g. iodine. The temperature is brought down by means of an ice-salt bath to 5° C. and chlorine is introduced at as rapid a rate as will give a temperature no higher than 20° C. (preferably around 15° C.) with the most effective cooling possible. Chlorination is continued until the reaction mixture attains a volume of about 1000 ml. This should take about eight to nine hours. The purplish-brown mixture is then allowed to stand overnight.

The mixture is then distilled at atmospheric pressure taking off all that comes over below 135° C. (still-pot temperature). The still-head temperature remains at about 55–57° C. and about 450 cc. of deep red $SCl_2$ is collected. The temperature is then allowed to fall to about 60° C. and a vacuum of 70 mm. Hg is applied. An additional 10 cc. $SCl_2$ comes over.

The light red residue is then allowed to cool to 45° C., and a mixture of 25 cc. methanol with 100 cc. diethyl ether is added dropwise over a period of about ten minutes. An immediate and vigorous reaction is noticed with appreciable lightening in the color of the solution. When addition is complete the mixture is vigorously agitated for an additional fifteen minutes (effective agitation can be applied by disconnecting the chlorine and pulling air through the sparger via the vacuum take-off).

The low boilers are then taken off by distillation at atmospheric pressure, about 75 cc. being collected, after which the residue is vacuum distilled at a pressure of about 50 mm. Hg. Fractionation is not necessary. The first 10 cc. of condensables are discarded and the next portion is collected as the pure product. This product is lemon yellow in color containing not the slightest reddish tinge characteristic of the sulfur chlorides and comes over at 72–73° C./50 mm. The last 20 cc. is left in the still pot to keep dissolved the sulfur formed in the decomposition. The last 30 cc. distilling over is collected separately and has a slight reddish tinge which can be removed by treating with ether and redistilling. The yield of pure perchloromethyl mercaptan is 831 g. (490 cc., 62%).

An even purer product can be obtained by treating this first distillate with a further portion of ether (50 cc.) returning to the cleaned still pot and redistilling. This cuts the yield down by about 3%. The product thus prepared does not develop any color on standing for over a month.

The reaction vessel and all fittings can easily be cleaned out with acetone.

*Example II*

The crude perchloromethyl mercaptan, prepared as in Example I and distilled to remove $CCl_4$ and most of the $SCl_2$, is treated with a mixture of 40 cc. ethanol and 75 cc. dimethyl ether. Vigorous reaction is accompanied by a distinct color change to light orange. The low boilers are then taken off by distillation at atmospheric pressure and the residue is distilled at reduced pressure. The first 10 cc. coming over at 50 mm. Hg are discarded and the next portion, B. Pt. 71–72° C./49 mm. is collected as the pure product. Yield: 792 g. (59%).

*Example III*

The crude perchloromethyl mercaptan, prepared as in Example I and distilled to remove $CCl_4$ and most of the $SCl_2$, is treated with a mixture of 60 cc. n-propanol and 60 cc. diethyl ether. Again, vigorous reaction is noted, but in this case the color change is considerably less distinct than in the previous examples. The low boilers are taken off by distillation at atmospheric pressure and the residue is vacuum distilled as before. The first 70 cc. comes off with a distinct pink color at 70–72° C./52 mm. The next portion is collected as the pure product, B. Pt. 71–73° C./50 mm. Yield: 740 g. (55%). The first fraction is treated with 15 cc. diethyl ether and redistilled.

An additional 35 g. (2.5%) pure perchloromethyl mercaptan was recovered.

I claim:

1. A process for the manufacture of perchloromethyl mercaptan which comprises chlorinating carbon disulfide in the absence of actinic radiation until the volume of the chlorinated product is from 2.00 to 2.5 times the volume of the original carbon disulfide, thereafter decomposing the by-product sulfur monochloride and sulfur dichloride by reaction with a member of the group consisting of the lower aliphatic alcohol, the lower aliphatic ethers and mixtures thereof, and separating the substantially unreacted perchloromethyl mercaptan from the more volatile by-products formed by said decomposition.

2. A process for the manufacture of perchloromethyl mercaptan which comprises chlorinating carbon disulfide in the absence of actinic radiation until the volume of the chlorination product is from 2.00 to 2.5 times the volume of the original carbon disulfide, and thereafter decomposing the sulfur dichloride in the chlorination mixture by reaction with a member of the group consisting of the lower aliphatic alcohols, the lower aliphatic ethers and mixtures thereof, and decomposing the sulfur monochloride in the chlorination mixture by reaction with a member of the group consisting of the lower aliphatic alcohols, the lower aliphatic ethers, and mixtures thereof, and separating the substantially unreacted perchloromethyl mercaptan from the more volatile by-products formed by said decomposition.

3. The process of claim 2 where the chlorination is continued until the volume of the chlorination mixture is 2.25 times the volume of the original carbon disulfide.

4. The process of claim 2 where the chlorination is effected in the presence of iodine.

5. The process of claim 2 where the chlorination is effected at a temperature not in excess of 30° C.

6. The process of claim 2 where the chlorination product is distilled to remove low boiling sulfur dichloride prior to reaction with a member of the group consisting of the lower aliphatic alcohols, the lower aliphatic ethers and mixtures thereof.

MORTIMER J. KAMLET.

No references cited.